United States Patent [19]

Prechter et al.

[11] 4,279,441
[45] Jul. 21, 1981

[54] AIR DEFLECTOR AND PIVOTABLE ROOF VENT PANEL APPARATUS FOR VEHICLE ROOFS

[75] Inventors: Heinz C. Prechter; Milton C. Kaltz, both of Ypsilanti, Mich.

[73] Assignee: American Sunroof Corporation, Southgate, Mich.

[21] Appl. No.: 52,627

[22] Filed: Jun. 27, 1979

[51] Int. Cl.³ .................................................. B60J 7/10
[52] U.S. Cl. ........................................ 296/218; 98/2.14
[58] Field of Search .............. 296/218, 219, 224, 1 S, 296/91; 98/2.11–2.15, 2; 49/463, 465

[56] References Cited

U.S. PATENT DOCUMENTS

| 1,413,704 | 4/1922 | Bresin | 49/463 |
|---|---|---|---|
| 3,156,175 | 11/1964 | Werner | 98/2 |
| 3,329,462 | 7/1967 | Baur | 296/218 |
| 3,431,014 | 3/1969 | Fritsch | 296/1 |
| 3,711,150 | 1/1973 | Perks | 296/218 |
| 3,727,973 | 4/1973 | Perks | 296/218 |
| 3,843,195 | 10/1974 | Lidington | 98/2.14 X |
| 3,853,371 | 12/1974 | Bienert | 296/218 |
| 3,904,239 | 9/1975 | Jardin | 296/91 X |
| 3,973,478 | 8/1976 | Gotz | 98/2.14 |
| 4,040,656 | 8/1977 | Clenet | 296/91 |
| 4,052,099 | 9/1977 | Lowery et al. | 296/91 |
| 4,067,604 | 1/1978 | Mori | 296/1 S X |
| 4,081,194 | 3/1978 | Jardin | 296/1 S |
| 4,130,966 | 12/1978 | Kujawa, Jr. et al. | 98/2.14 X |

FOREIGN PATENT DOCUMENTS 162014  5/1933  Sweden ..................................... 49/465

Primary Examiner—David M. Mitchell
Assistant Examiner—Norman L. Stack, Jr.
Attorney, Agent, or Firm—Basile, Weintraub & Hanlon

[57] ABSTRACT

A pivotable air deflector for a vehicle roof structure is adapted to removably receive a roof vent panel. The air deflector and roof vent panel pivot together as a unit between a closed position wherein the air deflector and roof vent panel are in substantial registry with the surface of the roof and an open, venting, forward-inclining position. The air deflector is held in the upward, forward-inclining position when the roof vent panel is completely removed from the vehicle to direct air currents away from the roof opening during movement of the vehicle.

9 Claims, 4 Drawing Figures

AIR DEFLECTOR AND PIVOTABLE ROOF VENT PANEL APPARATUS FOR VEHICLE ROOFS

BACKGROUND OF THE INVENTION

I. Field of the Invention:

This invention relates, in general, to vehicle roof structures and, more specifically, to vehicle roof structures incorporating air deflectors to protect the occupants of a vehicle from the uncomfortable air disturbances caused by turbulent air flowing into the opening in the roof of the vehicle during movement of the vehicle.

II. Description of the Prior Art:

The present day automotive market has experienced a phenomenal growth in the use of movable roof panels. These roof panels may be of the so-called "sun" or "moon" roof variety, which are formed of a transparent material such as glass or plastic, to let in light when in the closed position or they may be made of translucent or opaque materials such as metal, fiberglass, or the like. The roof panels may be moved into an open position for additional ventilation and to expose the occupants of the vehicle to the surrounding environmental conditions in several different ways including lowering one end of the panels and retracting the panels under the adjoining roof structure through manual or powered operation. Also known in the prior art are roof structures with pivotable vent panels wherein the rear portion of the panel is pivotable upward from the roof opening so as to provide additional ventilation for the vehicle. Such vent panels may also be completely removed from the roof so as to enable the driver to adapt the vehicle to a variety of weather and driving conditions.

Although both the sliding and pivotable vent type of roof panels provide the desirable advantages of additional ventilation and exposure to the surrounding weather conditions, both types possess certain deficiencies relating to the introduction of turbulent and uncomfortable air currents into the vehicle during its movement. A common disadvantage of the sliding type of roof panel is that the sliding panel does not buffer or protect the occupants of the vehicle from the wind which is turbulently introduced into the vehicle through the roof opening. Indeed, it has been found that the sliding roofs are often opened only a small amount during the operation of the vehicle to thereby avoid excessive drafts within the vehicle. At higher speeds, even a small opening causes an annoying draft within the vehicle which can only be prevented by installing a separate air deflector.

Although the pivotable vent type of roof panel forms an angle with the adjoining roof structure when in the open position and thereby acts to deflect the air currents flowing over the vehicle upward and away from the roof opening, it obviously provides no air deflection when the roof panel is completely removed from the vehicle.

Various constructions of air deflectors are known with the deflector being either rigidly fixed to the vehicle and projecting permanently above the surface of the roof or mounted in an inoperative position below the roof within the interior of the vehicle when the roof panel is in the closed position in such a manner that they may be moved to an operative position in which they are disposed at an angle to the air stream when the roof panel is open. It is also known to connect the air deflectors to the sliding roof panels so that they automatically move into position when the sliding roof panel is being opened and are moved back to their inoperative position by the roof panel when it is being closed.

Although the various types of air deflectors effectively deflect air currents away from the roof opening, their use creates other problems in the vehicle. In one instance, the air deflector mounted on the surface of the roof detracts from the aesthetic styling looks of the smooth roof lines of the vehicle. For another, the types of air deflectors disposed within the interior of the vehicle reduce the available amount of head room thereby making it more uncomfortable for the occupants of the vehicle. Finally, the air deflectors coupled to the sliding roof panels for automatic movement therewith require a complex coupling mechanism for moving the air deflectors between the operative an inoperative positions simultaneously with the movement of the sliding roof panel between its closed and open position.

Thus, it would be desirable to provide a vehicle roof structure having an opening therein which incorporates an air deflector operative to overcome the problems associated with the use of prior art air deflectors. It would also be desirable to provide an air deflector for a pivotable vent type of roof panel which is operative after the roof panel has been completely removed from the roof opening. It would also be desirable to provide an air deflector for a pivotable vent type of roof panel which is automatically maintained in the operative position after the roof panel has been removed from the vehicle. Finally, it would be desirable to provide an air deflector for a pivotable vent type of roof panel which can be installed without requiring excessive modification of the vehicle.

SUMMARY OF THE INVENTION

Herein disclosed is a pivotable air deflector and roof vent panel apparatus for vehicle roofs having an opening therein. The air deflector has a shape that conforms to the shape of the front portion of the roof opening and is mounted for pivotal movement between open and closed positions. The roof vent panel is removably received in the air deflector such that the air deflector and the roof vent panel pivot together as a unit between a closed position wherein the air deflector and the roof vent panel are in substantial registry with the surface of the adjoining roof structure and an open, venting forward-inclining position, when the roof vent panel is completely removed from the vehicle, such that the air deflector serves to direct the air currents flowing over the roof of the vehicle during its movement upward and away from the roof opening.

The novel air deflector and roof vent panel apparatus of this invention simply and without extensive modifications to the vehicle enables the desirable features of a removable roof vent panel to be combined with an air deflector to protect the occupants of the vehicle from the turbulent air currents flowing over the vehicle roof during the movement of the vehicle. By combining the air deflector and roof vent panel in a single assembly that pivots between a closed position and an open, venting position, the problems associated with prior art air deflectors, namely reduced interior head room or an unsightly exterior appearance, are overcome. Further, the air deflector is automatically urged or held in the upward, forward-inclining position after the roof vent panel has been completely removed from the vehicle without the need for the complex mechanisms and extensive vehicle modifications required in those prior art roof structures that automatically couple the movement of an air deflector with the sliding of the roof panel between open and closed positions.

DESCRIPTION OF THE DRAWING

The various features, advantages and other uses of this invention become more apparent by referring to the following detailed description and drawing in which.

DESCRIPTION OF THE PREFERRED EMBODIMENT

Figure 1:
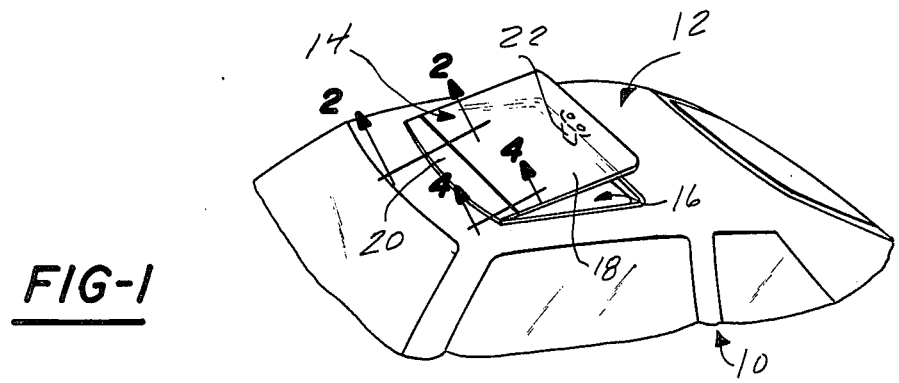
FIG. 1 is a pictorial view of a vehicle employing a roof structure constructed according to the teachings of this invention.

Throughout the following description, identical reference numbers are used to refer to the same component shown in multiple figures of the drawing.

Referring now to the drawing, and to FIG. 1 in particular, there is shown a portion of a motor vehicle 10 having a roof 12 employing an air deflector and roof vent panel apparatus, shown generally at reference number 14, constructed according to the teachings of this invention. The air deflector and roof vent panel apparatus 14 is disposed in an opening 16 which extends substantially across the entire width of the roof 12 of the vehicle 10. The opening 16 is preferably located near the front portion of the roof 12 so as to be located over the front seat of the vehicle 10.

The air deflector and roof vent panel apparatus 14 is disposed in the opening 16 and has substantially the same shape as the opening 16 so as to fit in substantial registry and contiguity with the surface of the roof when in the closed position. The air deflector and roof vent panel apparatus 14 is formed of a removable roof vent panel 18 and a pivotable air deflector 20. The roof vent panel 18 is preferably formed of a transparent material, such as glass or plastic. The panel 18 can, also, be formed of an opaque material, such as metal, fiberglass and the like, or it could be formed of translucent glass or plastics. A suitable frame assembly and sealing member, not shown, are disposed within and attached to the edge of the opening 16 within the roof 12 so as to provide a moisture and air impervious seal around the air deflector and roof vent panel apparatus 14 when it is in the closed position.

Also shown in FIG. 1 is a latch assembly, shown generally at reference number 22, which is attached to the rear portion of the roof vent panel 18, The latch assembly 22, which can be any conventional type of latch mechanism, such as a toggle linkage, locks the air deflector and roof vent panel apparatus 14 in either the closed or open position. In addition, the latch assembly 22 is detachably connected to the roof 12 of the vehicle 10 so as to enable the roof vent panel 18 to be completely removed from the vehicle itself.

Figure 3:
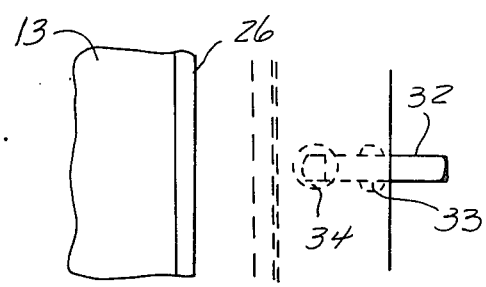
FIG. 3 is a plan view of the pivotal air deflector and roof vent panel shown in FIG. 2.
Figure 2:
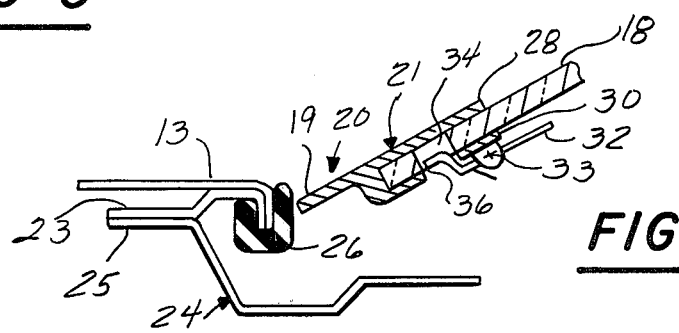
FIG. 2 is a cross-sectional view, generally taken along line 2—2 in FIG. 1, of the roof structure of this invention.
Figure 4:
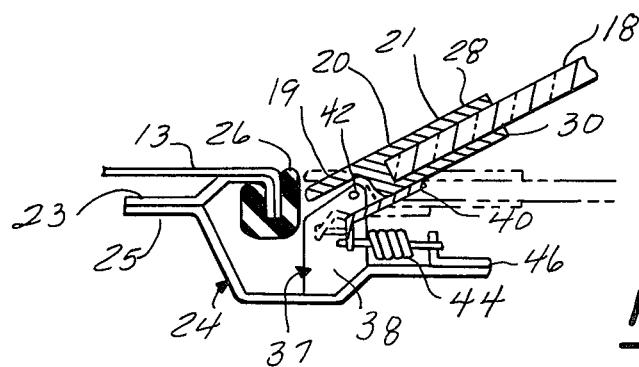
FIG. 4 is a cross-sectional view, generally taken along line 4—4 in FIG. 1. showing the pivot mechanism of the air deflector and roof vent panel apparatus of this invention.

Turning now to FIGS. 2, 3, and 4 there is shown a detailed representation of the air deflector and roof vent panel apparatus 14 constructed according to the teachings of this invention. FIG. 2 depicts a cross-sectional view through the approximate center of the air deflector and roof vent panel apparatus 14 and shows the roof vent panel 18 and air deflector 20. As shown therein, reference number 13 depicts that portion of the roof structure 12 of the vehicle 10 that is adjacent to the front edge of the opening 16 in the roof 12. A head liner 24, comprising upper and lower panels 23 and 25, respectively, which is disposed on the interior of the vehicle 10 and forms the ceiling or underside of the roof 12, is also depicted. The air deflector and roof vent panel apparatus 14 is also depicted in its open, forward-inclining position with a seal member 26 formed of a suitable sealing material, such as rubber, disposed between the air deflector and roof vent panel apparatus 14 and the adjacent portions of the roof 12 to prevent moisture and air from passing therethrough to the interior of the vehicle 10.

As shown in FIG. 2, the air deflector 20 has a front portion 19 having a single edge shaped to conform to the shape of the front edge of the opening 16 of the roof 12 so as to be in substantial registry therewith when the air deflector 20 is in the closed position. The air deflector 20 also includes a rear portion 21 formed of first and second, spaced-apart, side portions 28 and 30, respectively, which receive the front portion of the roof vent panel 18. The roof vent panel 18 is removably received within the air deflector 20 and is held in position either through the use of friction, a seal member, not shown, or a suitable connecting means 32. The connecting means 32 is utilized to prevent relative movement between the roof vent panel 18 and the air deflector 20 such that the roof vent panel 18 and the air deflector 20 pivot together, as described hereafter, as a unit between closed and open positions. As seen in FIGS. 2 and 3, the roof vent panel 18 contains a suitably positioned aperture 34 which is aligned with a corresponding aperture 36 in the second side portion 30 of the air deflector 20 when the roof vent panel 18 is inserted within the air deflector 20. According to the preferred embodiment of this invention, a spring-loaded rocker type latch member 32 is inserted through the apertures 34 and 36 to bias the air deflector 20 and the roof vent panel 18 together.

The latch member 32 is mounted for pivotal movement about a hinge pivot 33 which is attached to the lower side portion 30 of the roof vent panel 18 by suitable means. The latch member 32 is of conventional design and may be formed of a hard resilient material, such as rubber, so as to provide suitable force to hold the roof vent panel 18 and the air deflector 20 together.

In operation, an upwards force on the rear portion of the latch member 32 towards the roof 12 of the vehicle 10 will cause the front end of the latch 32 to pivot or lower out of the apertures 34 and 36. In this manner, the roof vent panel 18 is released from the air deflector 20 for easy removal. A downwards force on the rear of the latch 32 will pivot the front end into the apertures 34 and 36 and hold the roof vent panel 18 and the air deflector 20 in engagement.

Referring now to FIG. 4, there is shown a cross sectional view through one of the forward ends of the air deflector 20 showing the pivot mechanism 37 of this invention. It is to be understood that a similar pivot mechanism 37 is located at the other forward end of the air deflector 20 to form an axis extending transversely to the longitudinal axis or length of the vehicle 10. As shown in FIG. 4, the pivot mechanism 37 comprises a bracket 38 which is attached by a suitable connecting or attachment means, not shown, to the bottom panel 25 of the headliner 24. The upper portion of the bracket 38 is formed in a curved or arcuate surface for the air deflector 20 to pivot thereover as described hereafter. Thus, the air deflector 20 and the roof vent panel 18 rotate about a transverse axis formed between a pivot point 42 in the bracket 38 and its opposed pivot member between a closed position, shown in phantom, wherein the air deflector and roof vent panel apparatus 14 is in substantial registry with the adjoining surfaces of the roof 12 and an open, venting, forwardly-inclining position wherein the air deflector and roof vent panel apparatus 14 presents a forward-inclining surface to the air currents flowing over the roof of the vehicle.

Also shown in FIG. 4 is a biasing means 44 which upwardly urges or holds the air deflector 20 in the open, forward-inclining position when the roof vent panel 18 is completely removed therefrom such that the air deflector 20 serves to direct air currents flowing over the roof of the vehicle 10 upwards and away from the opening 16 in the roof 12 to thereby protect the occupants of the vehicle from the disturbing air currents typically associated with open roof structures. According to the preferred embodiment of this invention, the biasing means 44, which is one of two such means located at opposite forward ends of the air deflector 20 comprises a leaf or clock type spring which is connected to an angle bracket 46 at one end and a plate member 40 at the other. The angle bracket 46 is attached to the bottom panel 25 of the headliner 24 and includes an upstanding flange portion to which one end of the biasing means 44 is connected. The plate member 40 is connected to the lower side portion 30 of the air deflector 20. It also has a flange portion to which the other end of the biasing means 44 is connected Thus, the biasing means 44 provides a force which pulls or urges the flange portion of the plate 40 rearward which drives or urges the other end of the plate member 40 as well as the air deflector 20, upwards. In so doing, the front portion of the air deflector 20 pivots or slides over the top portion of the bracket 38.

In operation, the roof vent panel 18 is inserted in the air deflector 20. The air deflector and roof vent panel apparatus 14 can then be manually moved between closed to open position by releasing the latch mechanism 22 and urging the latch or roof vent panel 18 on the appropriate direction until the latch mechanism 22 locks again. If it is desired to provide further ventilation or to expose the occupants of the vehicle to the surrounding environmental conditions, the latch 22 is disengaged from the rear portion of the roof 12 and the connecting member 32 pivoted to itself from the apertures 34 and 36 in the roof vent panel 18 and air deflector 20, respectively, so as to enable the roof vent panel 18 to be completely removed from the air deflector 20 and the vehicle 10. With the roof vent panel 18 removed from the air deflector 20, the biasing means 44 urges or holds the air deflector 20 in the upward forward-inclining position such that the air deflector 20 serves to direct air currents flowing over the roof 12 of the vehicle 10 upwards and away from the opening 16 in the roof 12 which thereby protects the occupants of the vehicle from the uncomfortable air disturbances normally associated with open roof structures.

What is claimed is:

1. A roof structure for a vehicle having an opening in the roof comprising:

an air deflector disposed in said roof opening, said air deflector being pivotable about an axis extending transverse to the longitudinal axis of said vehicle between a down position in which said air deflector is in substantial registry with the adjoining roof structure of said vehicle and an upward, forward-inclining position; and a roof vent panel removably received in said air deflector such that said air deflector and said roof vent panel pivot together as a unit about said transverse axis between a closed, sealing position and an open, forward-inclining, venting position, said roof vent panel being removable from said air deflector, with said air deflector remaining in said forward-inclining position when said roof vent panel is removed therefrom to direct air currents flowing across said roof of said vehicle away from said opening therein.

2. A roof structure for a vehicle having an opening in the roof comprising:

an air deflector disposed in said roof opening, said air deflector being pivotable about an axis extending transverse to the longitudinal axis of said vehicle;

a roof vent panel removably received in said air deflector such that said air deflector and said roof vent panel pivot together as a unit about said transverse axis between a closed, sealing position and an open, forward-inclining, venting position, said roof vent panel being removable from said air deflector, with said air deflector serving to direct air currents flowing across said roof of said vehicle away from said opening therein; and means for biasing the air deflector to the forward-inclining position when the roof vent panel is removed from said air deflector.

3. The roof structure of claim 2 wherein the biasing means comprises first and second springs, each disposed at an end of the air deflector and acting upon said air deflector to urge said air deflector to the forward-inclining position.

4. The roof structure of claim 1 further including means, detachably connected to the roof, for latching the roof vent panel in either of the open or closed positions, said latching means being detachably connected to said roof so as to enable said roof vent panel to be completely removed from the vehicle.

5. The roof structure of claim 1 further including means for removably connecting the roof vent panel to the air deflector when said roof vent panel is inserted in said air deflector.

6. The roof structure of claim 1 wherein the air deflector has a front portion formed to the shape of the adjacent portion of the roof and a rear portion having a substantially U-shaped cross sectional configuration formed of first and second, spaced-apart, flange portions for receiving the roof vent panel therebetween.

7. A roof structure for a vehicle having an opening defining front rear and side edges in said roof comprising:

an air deflector having front and rear portions, said front portion being disposed adjacent to said front edge of said roof opening and being pivotable about an axis extending transverse to the longitudinal axis of said vehicle between a closed position and an open, forward-inclining position;

a roof vent panel having front and rear portions, said front portion of said roof vent panel being removably received within said rear portion of said air deflector;

a connecting member detachably connecting said roof vent panel to said air deflector when said roof vent panel is disposed in said air deflector;

means, connected to said rear portion of said roof vent panel, for latching said roof vent panel in either of said open or closed positions, said latching means being detachably connected to said roof such that said roof vent panel can be completely removed from said vehicle; and means, connected to said air deflector, for biasing said air deflector to said forward-inclining position when said roof vent panel is removed therefrom such that said air deflector serves to direct air currents flowing across the vehicle away from said opening therein.

8. A vehicle having a fixed, rigid roof over a passenger compartment comprising:

an opening in said roof;

an air deflector disposed in said opening, said air deflector being pivotable about an axis extending transverse to the longitudinal axis of the said vehicle;

a roof vent panel having front and rear portions, said front portion being removably received in said air deflector such that said air deflector and said roof vent panel pivot together as a unit between a closed, sealing position and an open, forward-inclining, venting position, with said air deflector remaining in said forward-inclining position when said roof vent panel is removed therefrom to direct air currents flowing across said roof of said vehicle away from said opening therein; and means, detachably connected to said roof, for latching said roof vent panel in either of said open and closed positions, said latching means being detachably connected to said roof so as to enable said roof vent panel to be completely removed from said vehicle.

9. The vehicle of claim 8 further including means for biasing the air deflector to the forward-inclining, venting position when the roof vent panel is removed therefrom.

* * * * *